United States Patent
Illikkal et al.

(10) Patent No.: US 7,346,680 B2
(45) Date of Patent: Mar. 18, 2008

(54) SPECULATIVE PREFETCH OF A PROTOCOL CONTROL BLOCK FROM AN EXTERNAL MEMORY UNIT

(75) Inventors: Rameshkumar G. Illikkal, Portland, OR (US); Gregory D. Cummings, Portland, OR (US)

(73) Assignee: Intel Corporation, Santa Clara, CA (US)

(*) Notice: Subject to any disclaimer, the term of this patent is extended or adjusted under 35 U.S.C. 154(b) by 910 days.

(21) Appl. No.: 10/667,691

(22) Filed: Sep. 22, 2003

(65) Prior Publication Data

US 2005/0066028 A1    Mar. 24, 2005

(51) Int. Cl.
 G06F 15/173    (2006.01)
 G06F 15/16    (2006.01)

(52) U.S. Cl. .............. 709/224; 709/223; 709/250

(58) Field of Classification Search ............... None
See application file for complete search history.

(56) References Cited

U.S. PATENT DOCUMENTS

| | | | |
|---|---|---|---|
| 5,056,058 A | 10/1991 | Hirata et al. | |
| 5,678,060 A | 10/1997 | Yokoyama et al. | |
| 6,122,670 A | 9/2000 | Bennett et al. | |
| 6,208,651 B1 | 3/2001 | Van Renesse et al. | |
| 6,393,457 B1* | 5/2002 | Allison et al. | 709/201 |
| 6,434,620 B1 | 8/2002 | Boucher et al. | |
| 6,549,960 B1* | 4/2003 | Allison et al. | 710/29 |
| 6,625,149 B1 | 9/2003 | Brustoloni et al. | |
| 6,820,127 B2 | 11/2004 | Banerjee | |
| 2002/0156927 A1 | 10/2002 | Boucher et al. | |
| 2002/0165992 A1 | 11/2002 | Banerjee | |
| 2003/0031172 A1 | 2/2003 | Grinfeld | |
| 2004/0218631 A1 | 11/2004 | Ganfield | |

OTHER PUBLICATIONS

Murali Rangarajan et al., "TCP Servers: Offloading TCP Processing in Internet Services. Design, Implementation, and Performance", Dept. of Computer Science, Rutgers University, Piscataway, NJ 08854-8019, XP-002286342, 2002, pp. 1-14.

* cited by examiner

Primary Examiner—John B. Walsh
(74) Attorney, Agent, or Firm—Buckley, Maschoff & Talwalkar LLC (57) ABSTRACT

According to some embodiments, a protocol control block is speculatively pre-fetched from an external memory unit.

13 Claims, 11 Drawing Sheets

SPECULATIVE PREFETCH OF A PROTOCOL CONTROL BLOCK FROM AN EXTERNAL MEMORY UNIT

BACKGROUND

Devices may exchange information via a communication network. For example, a server may exchange packets of information with a user device, such as a Personal Computer (PC), via the Internet. Moreover, a single device, such as a server, may exchange information with a number of different devices through a number of different connections. In this case, the device may need to manage the connections and associate each packet that is received (or that is to be transmitted) with an appropriate connection. These operations may be time-consuming and might require a significant amount of memory (which can increase the cost of the device)—especially for relatively high-speed networks and/or when a relatively large number of connections can be supported.

DETAILED DESCRIPTION

Figure 1:
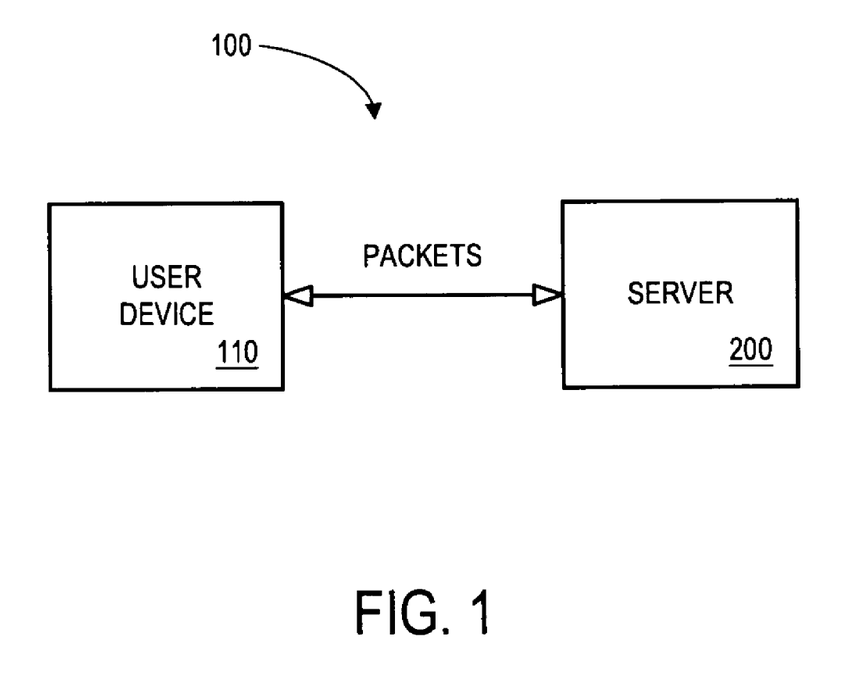
FIG. 1 is a block diagram of a communication network.

According to some embodiments, information is exchanged via a communication network. For example, FIG. 1 is a block diagram of a communication network 100 in which "packets" of information are exchanged between a user device 110 and a server 200. As used herein, a "packet" of information may be exchanged, for example, using Internet Protocol (IP), such as the one defined by the Internet Engineering Task Force (IETF) RFC 2460 entitled "Internet Protocol, Version 6" (December 1998). Moreover, the packets may be exchanged in accordance with Transmission Control Protocol (TCP) as defined by the IETF Request For Comment (RFC) 793 entitled "Transmission Control Protocol" (September 1981).

Figure 2:
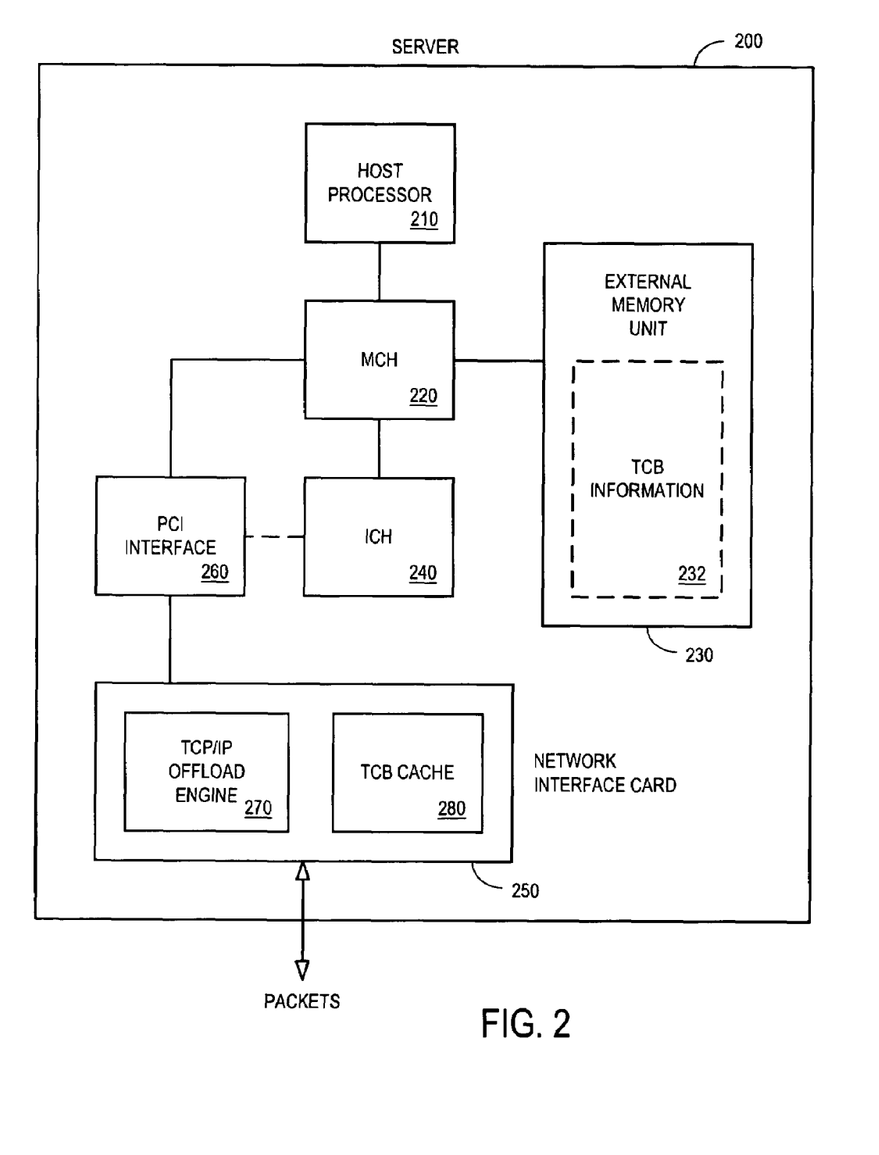
FIG. 2 is a block diagram of a server.

FIG. 2 is a block diagram of a server 200. The server 200 includes a host processor 210 (e.g., one or more INTEL® PENTIUM® 4 processors) coupled to a memory unit 230 and an Input Output Controller Hub (ICH) 240 through a Memory Controller Hub (MCH) 220, such as the Intel® 82875P. The server 200 also includes a Network Interface Card (NIC) 250 that may exchange packets of information in accordance with TCP/IP via a communication network, such as the Internet or a Local Area Network (LAN).

In accordance with TCP/IP, the server 200 may exchange packets with a number if different devices by establishing one or more "connections" with each device. When a packet is received by (or is to be sent from) the server 200, TCP processing is performed on the packet (e.g., to associate the packet with the appropriate connection). The maintenance of TCP connections and the processing of packets may require the use of several variables, referred to as a TCP Protocol control block (TCB). For example, the TCB may include local and remote socket numbers, the security and precedence of a connection, pointers to send and receive buffers, and/or pointers to a retransmit queue and to a current segment. In addition, variables relating to send and receive sequence numbers may be stored in the TCB.

The TCB information 232 may be stored in the memory unit 230. Moreover, the host processor 210 may perform TCP processing (e.g., when a packet is received or is to be sent). It may be impractical, however, to have the host processor 210 perform the TCP processing, especially for relatively high-bandwidth networks and/or when a significant number of connections need to be managed (e.g., the server 200 may be capable of managing tens of thousands of connections).

To reduce the burden on the host processor 210, a TCP/IP offload engine 270 may be provided on the NIC 250. In this case, the TCP/IP offload engine 270 may perform TCP processing when a packet is received or when a packet is ready to be sent. For example, after TCP processing is performed on a received packet, the appropriate information can be stored in the memory unit 230 for use by the host processor 210 (e.g., by an application executing on the host processor 210).

To perform the TCP/IP processing, the offload engine 270 may need to fetch from the "external" memory unit 230 (e.g., external to the NIC 250) the TCB information 232 associated with the appropriate connection. Note, however, that the NIC 250 may access information from the external memory unit 230 via a relatively slow interface 260 (e.g., as compared to the other MCH 220 interfaces), such as one that operates in accordance with the Peripheral Component Interconnect (PCI) Standards Industry Group (SIG) standards entitled "Conventional PCI 2.2" or "PCI Express 1.0." Note that according to some embodiments, the PCI interface 260 may receive information directly from the ICH 240.

To avoid frequent and time-consuming accesses to the external memory unit 230, the NIC 250 may include a local TCB cache 280 that stores TCB information. When the server 200 is capable of managing a large number of connections, however, it might be impractical to store all of the TCB information 232 in the TCB cache 280 (e.g., because of the cost associated with providing the large amount of memory that would be required). Thus, even with a local TCB cache 280 the NIC 250 may need to frequently access the external memory unit 230.

Figure 3:
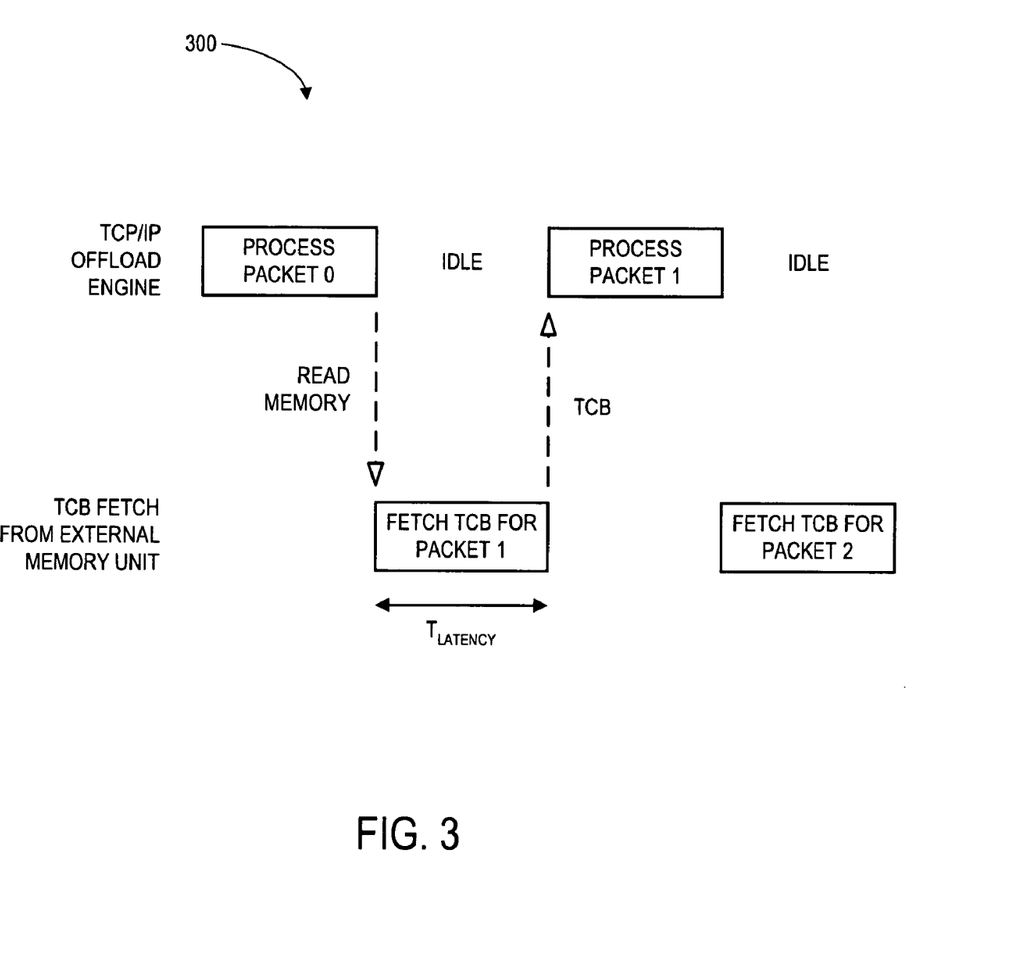
FIG. 3 is a timeline that illustrates packet processing.

FIG. 3 is a timeline 300 that illustrates packet processing. After one packet (packet 0) is processed by the TCP/IP offload engine 270, the next packet (packet 1) needs to be processed. Before packet 1 can be processed, however, the offload engine 270 may need to fetch from the external memory unit 230 the TCB associated with packet 1's connection. After the TCB for the appropriate connection is received by the offload engine 270 (e.g., after $T_{LATENCY}$), the packet can be processed (e.g., and, in the case of a received packet, be provided to the host processor 210). Thus, there may be periods of time when the offload engine 270 is idle (e.g., while the fetch is being performed).

Figure 4:
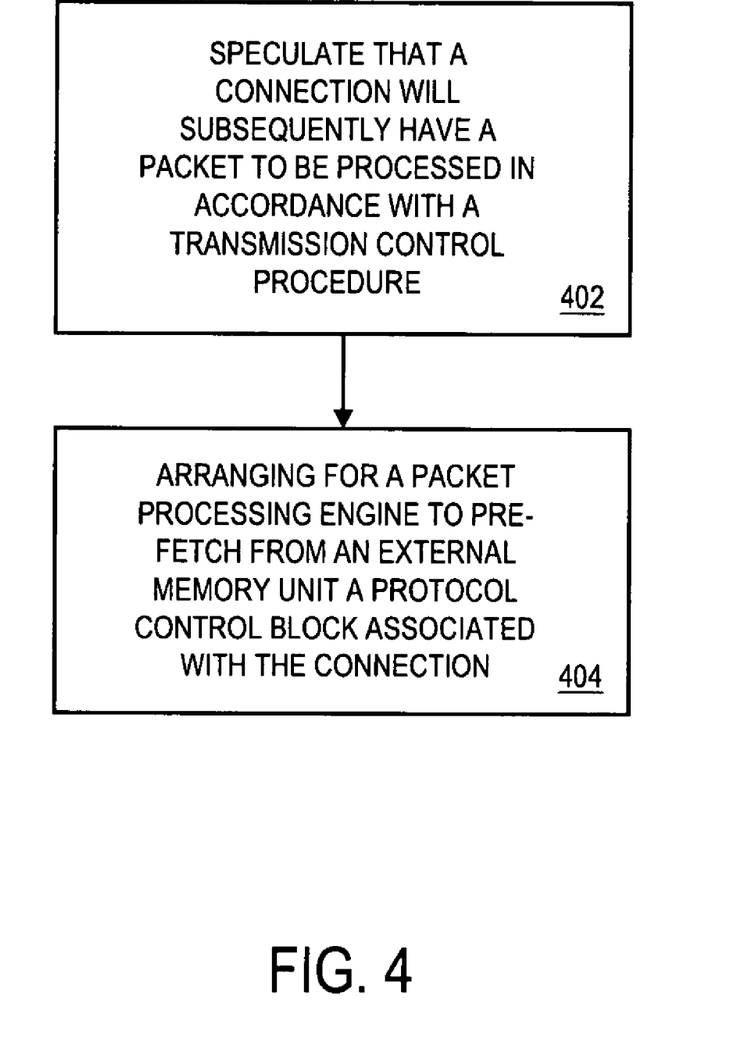
FIG. 4 is a flow chart of a method according to some embodiments.

FIG. 4 is a flow chart of a method according to some embodiments. The flow charts described herein do not necessarily imply a fixed order to the actions, and embodiments may be performed in any order that is practicable. The method of FIG. 4 may be associated with, for example, the server 200 described with respect to FIG. 2. Note that any of the methods described herein may be performed by hardware, software (including microcode), or a combination of hardware and software. For example, a storage medium may store thereon instructions that when executed by a machine result in performance according to any of the embodiments described herein.

At 402, a device predicts or "speculates" that a connection will subsequently have a packet to be processed in accordance with a transmission control protocol (e.g., TCP). For example, the offload engine 270 or host processor 210 may speculate that a particular connection will subsequently have a packet that will be received by (or that will be sent from) the server 200.

At 404, it is arranged for a packet processing engine to pre-fetch from an external memory unit a protocol control block associated with the connection. For example, it may be arranged for the offload engine 270 pre-fetch the appropriate TCB from the external memory unit 230.

Figure 5:
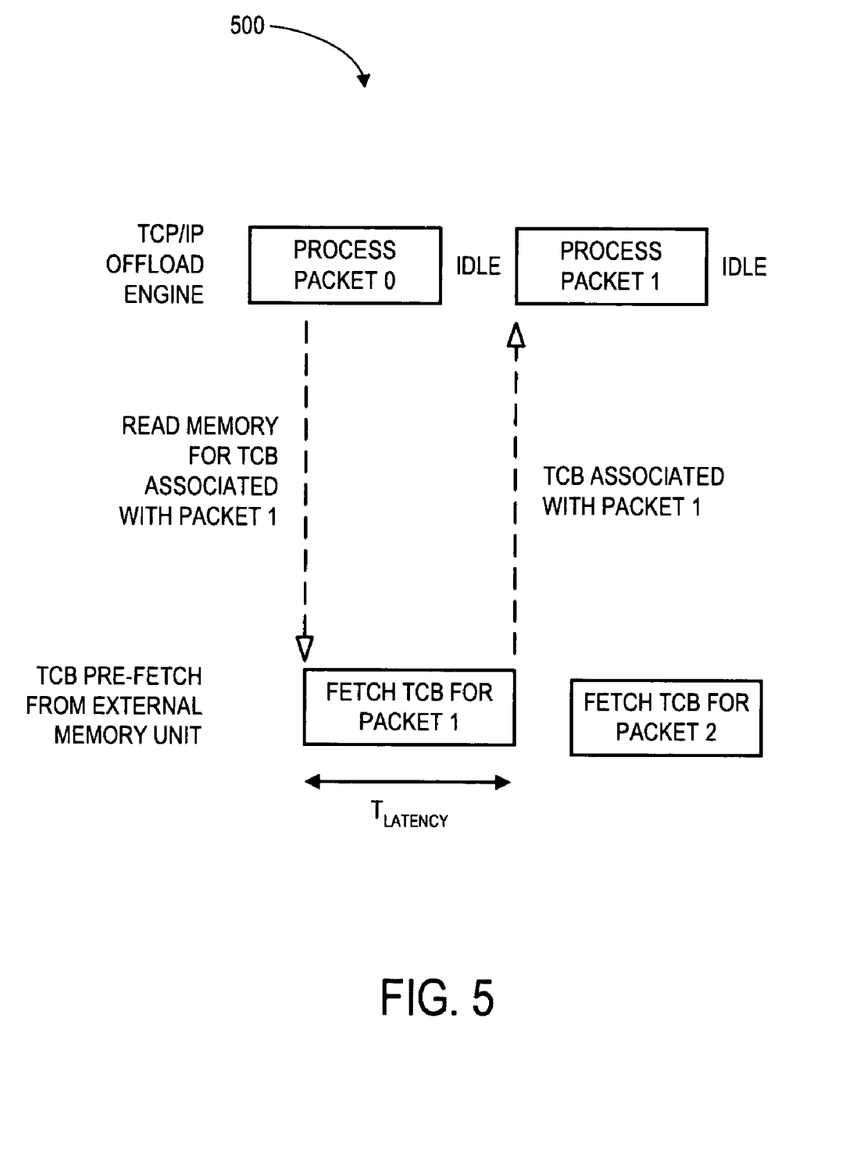
FIG. 5 is a timeline that illustrates packet processing when a protocol control block is pre-fetched according to some embodiments.

By pre-fetching the appropriate protocol control block before a packet is received (or before a packet needs to be sent), the amount of idle time associated with the packet processing engine may be reduced—and the performance of a server may be improved. For example, FIG. 5 is a timeline 500 that illustrates packet processing when a TCB is pre-fetched according to some embodiments.

While one packet (packet 0) is still being processed by the TCP/IP offload engine 270, the offload engine 270 pre-fetches the TCB associated with another packet's connection from the external memory unit 230 (e.g., another connection for which it has been predicted that another packet, namely packet 1, will subsequently be received or sent). In this way, the offload engine 270 can continue to process packet 0 while the pre-fetch is being performed (e.g., via a relatively slow interface). Thus, periods of time during which the offload engine 270 is idle may be reduced.

Several different techniques may be used to speculate which connections will subsequently have a packet that is received (or is to be sent). For example, the server 200 may exchange Hyper-Text Transfer Protocol (HTTP) information as defined by the Word Wide Web Consortium (W3C) RFC 2068 entitled "HTTP 1.1" (January 1997). In this case, when the server 200 receives a packet for a particular connection (e.g., an HTTP "get" from a particular client), it can be predicted that the server 200 will subsequently respond with one or more packets through that same connection (e.g., when sending packets associated with an HTTP "send" to that client). Similar predictions may be made when information is exchanged in accordance with the IETF RFC 3347 entitled "Small Computer Systems Interface Protocol Over the Internet (iSCSI) Requirements and Design Considerations" (July 2002)—namely an iSCSI "request" packet through a particular connection may subsequently result in one or more iSCSI "send" packets through that connection.

Note that the offload engine 270 may process a large number of packets for a large number of connections, but the size of the TCB cache 280 on the NIC 250 may be limited. As a result, TCB information that is pre-fetched too soon (e.g., too long before it is needed) could be lost because it has been overwritten with information for other connections.

Figure 6:
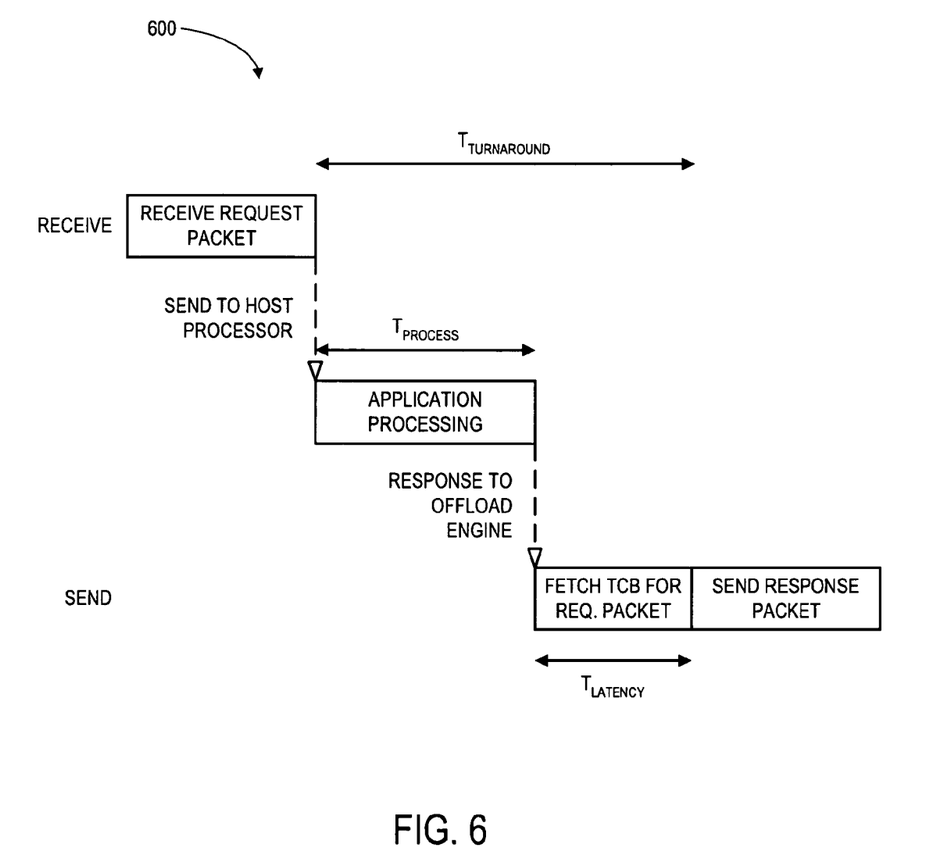
FIG. 6 is a timeline that illustrates receive packet processing.

For example, FIG. 6 is a timeline 600 that illustrates receive packet processing. After an iSCSI request packet is received through a particular connection and is processed by the offload engine 270, the information is passed to the host processor 210. An application executing on the host processor 210 processes the information (e.g., for a period of time equal to $T_{PROCESS}$) and provides an iSCSI response packet to the offload engine 270 for delivery through the same connection.

If the offload engine 270 had pre-fetched the appropriate TCB information for that connection too soon before the iSCSI response packet was ready, the information in the TCB cache 280 may have already been overwritten with information for other connections. The TCB information would then need to be re-fetched for that connection in order to process the iSCSI response packet, resulting in a total turnaround time ($T_{TURNAROUND}$) of $T_{PROCESS}+T_{LATENCY}$. Note also that if the offload engine 270 waits too long before starting to pre-fetch the TCB information for a connection, it may need to remain idle until the pre-fetch from the external memory unit 230 is completed.

Figure 7:
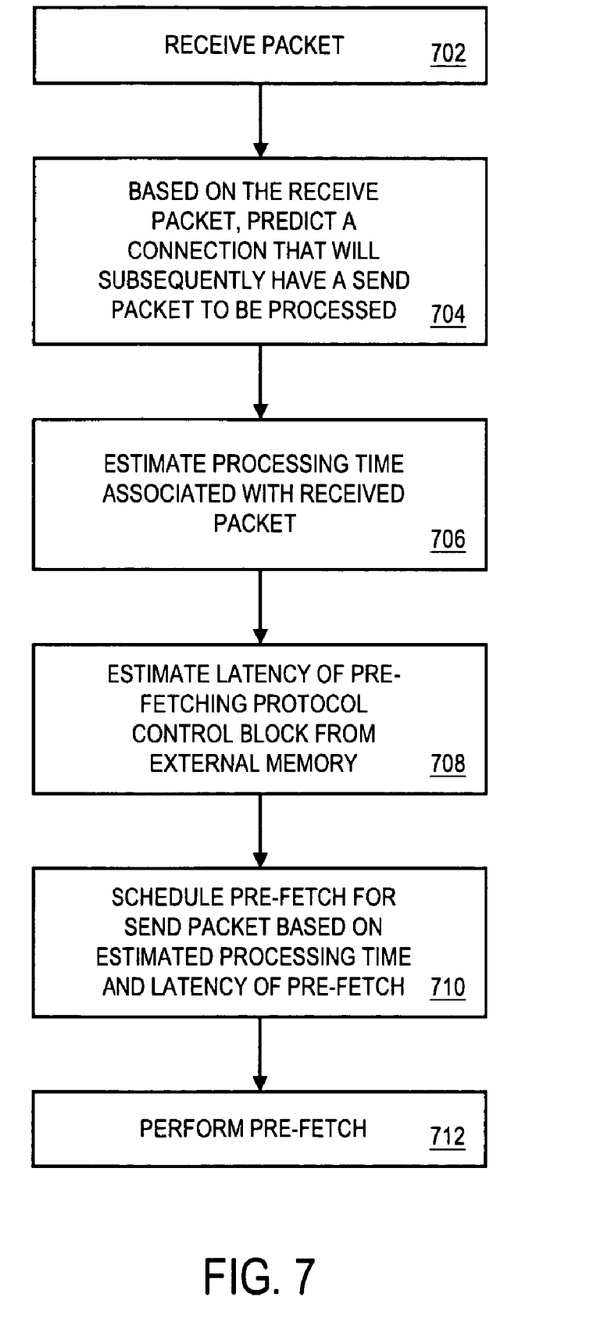
FIG. 7 is a flow chart of a method of receive packet processing according to some embodiments.

FIG. 7 is a flow chart of a method of receive packet processing according to some embodiments. At 702, a packet is received. For example, the server 200 may receive the packet at the offload engine 270 or the host processor 210.

Based on the receive packet, it is predicted at 704 that a connection will subsequently have a send packet to be processed. For example, the offload engine 270 may predict that the connection associated with the receive packet will subsequently have a send packet. According to other embodiments, the host processor 210 predicts that the connection will subsequently have a send packet.

A processing time associated with the receive packet is estimated at 706. For example, the offload engine 270 or host processor 210 might estimated how long will take for an application to respond to the receive packet (e.g., $T_{PROCESS}$).

At 708, a latency associated with pre-fetching the protocol control block from external memory is estimated. For example, the offload engine 270 or host processor 210 may estimate how long will take for a TCB pre-fetch to be performed via the PCI interface 260, MCH 220, and/or external memory unit 230 (e.g., $T_{LATENCY}$).

A pre-fetch for the predicted send packet is then scheduled at 710 based on the estimated processing time and latency of the pre-fetch. For example, the pre-fetch may be scheduled based on $T_{PROCESS}-T_{LATENCY}$. In this way, the pre-fetch should complete just as the send packet for that connection is ready.

At 712, the pre-fetch is performed. For example, the offload engine 270 might pre-fetch the TCB information and store it in the TCB cache 280 as scheduled. When the send packet is provided from the host processor 210 to the offload engine 270, it can then be processed without waiting for the TCB information to be received from the external memory unit 230 (or without waiting for a significant period of time).

Figure 8:
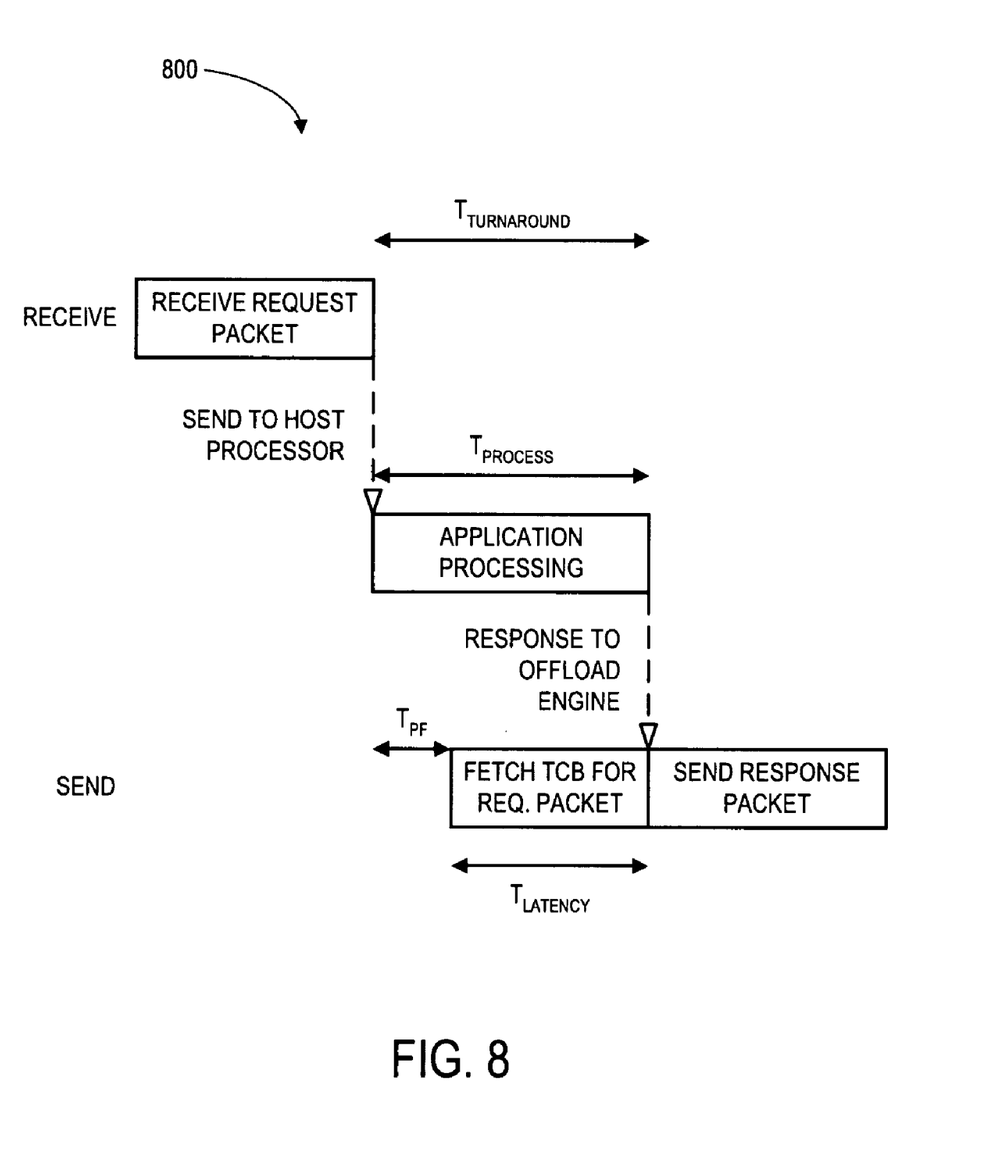
FIG. 8 is a timeline that illustrates receive packet processing when a protocol control block is pre-fetched according to some embodiments.

FIG. 8 is a timeline that illustrates receive packet processing when a protocol control block is pre-fetched according to some embodiments. After the receive packet is processed by the offload engine 270 and is provided to the host processor 210, a pre-fetch for that connection is scheduled at a pre-fetch time ($T_{PF}$) equal to the estimated $T_{PROCESS}$ reduced by the estimated $T_{LATENCY}$. In this way, the pre-fetch may be completed at substantially the same time as associated send packet through that connection is provided from the host processor 210 to the offload engine 270. The offload engine 270 may then process and transmit the send packet without unneeded idling (e.g., during $T_{LATENCY}$).

Note that $T_{PROCESS}$ could vary for any number of reasons (e.g., due to the number of connections being handled by the host processor). Similarly, $T_{LATENCY}$ might change over a period of time (e.g., because of memory accesses being performed for other reasons). As a result, according to some embodiments these estimated values are dynamically tuned or adjusted (e.g., by the offload engine 270 and/or the host processor 210) to improve the performance of the server 200. For example, prior actual values could be used to adjust future estimate values.

Figure 9:
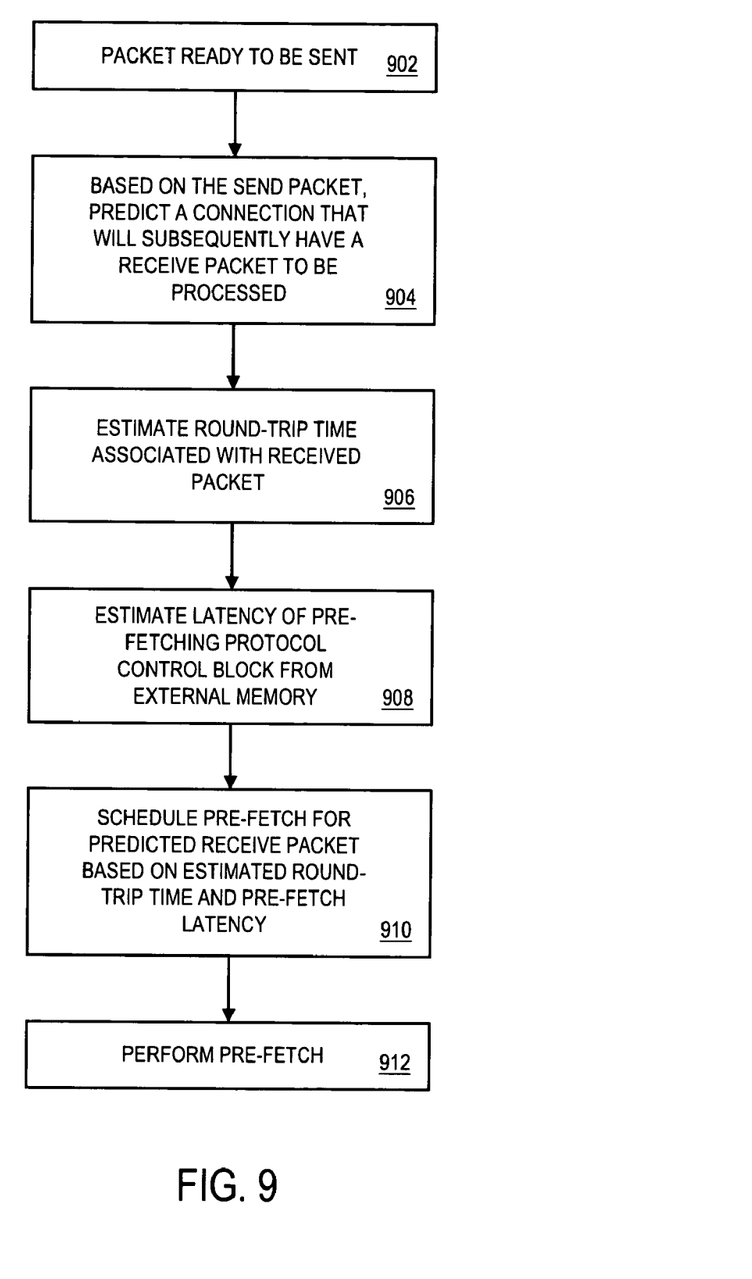
FIG. 9 is a flow chart of a method of send packet processing according to some embodiments.

FIG. 9 is a flow chart of a method of send packet processing according to some embodiments. At 902, a packet is ready to be sent. For example, the server 900 may be ready to send the packet from the offload engine 270 or the host processor 210.

Based on the send packet, it is predicted at 904 that a connection will subsequently have a receive packet to be processed. For example, the offload engine 270 might predict that the connection associated with the send packet will subsequently have a receive packet. According to other embodiments, the host processor 210 predicts that the connection will subsequently have a receive packet.

A "round-trip" time associated with the send packet is estimated at 906. For example, the offload engine 270 or host processor 210 might estimated how long it will take for the send packet to reach a user device through a network, be processed by the user device, and result in a receive packet being received by the server 200 (e.g., $T_{ROUND-TRIP}$).

At 908, a latency associated with pre-fetching the protocol control block from external memory is estimated. For example, the offload engine 270 or host processor 210 might estimate how long will take for a TCB pre-fetch to be performed via the PCI interface 260, MCH 220, and/or external memory unit 230 (e.g., $T_{LATENCY}$).

A pre-fetch for the predicted receive packet is then scheduled at 910 based on the estimated round-trip time and latency of the pre-fetch. For example, the pre-fetch may be scheduled based on $T_{ROUND-TRIP} - T_{LATENCY}$. In this way, the pre-fetch should complete at substantially the same time as the send packet for that connection is received from the network.

At 912, the pre-fetch is performed. For example, the offload engine 270 may pre-fetch the TCB information and store it in the TCB cache 280 as scheduled. When the receive packet is then received at the offload engine 270 (from the network), it may be processed without waiting (or without waiting too long) for the TCB information to be received from the external memory unit 230.

Figure 10:
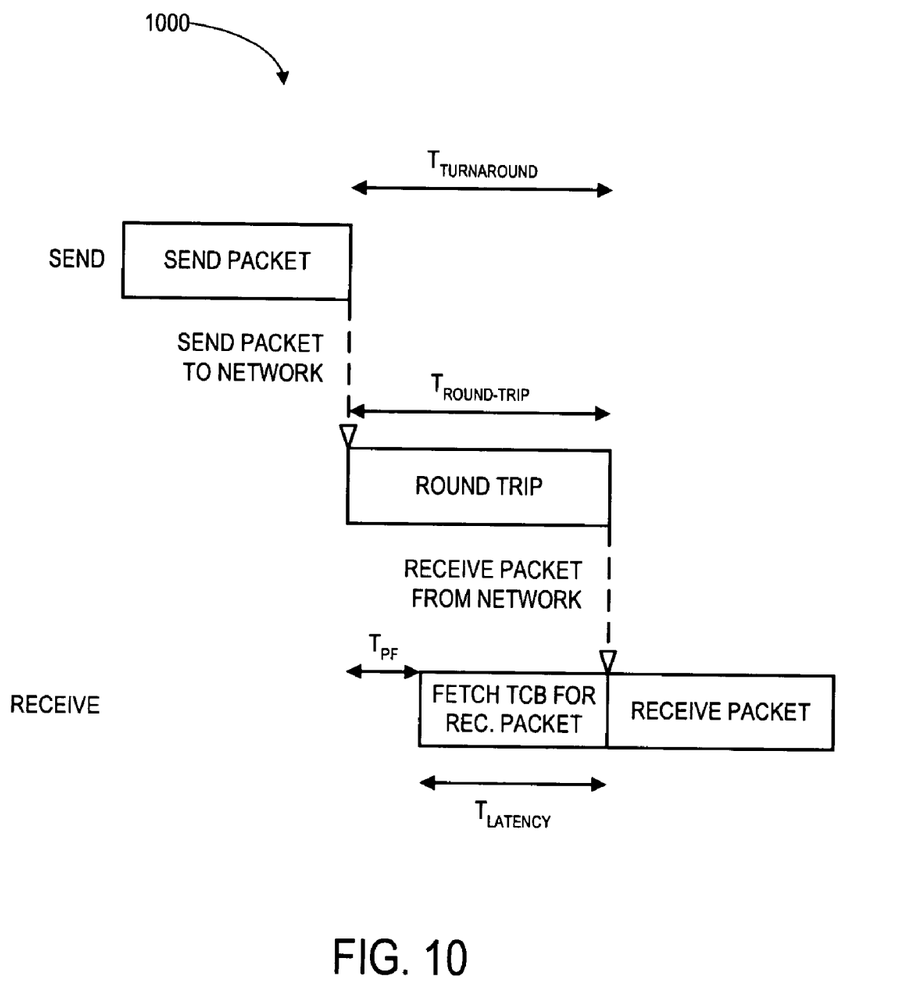
FIG. 10 is a timeline that illustrates send packet processing when a protocol control block is pre-fetched according to some embodiments.

FIG. 10 is a timeline that illustrates send packet processing when a protocol control block is pre-fetched according to some embodiments. After the send packet is processed and sent through a network, a pre-fetch for that connection is scheduled at a pre-fetch time ($T_{PF}$) equal to the estimated $T_{ROUND-TRIP}$ reduced by the estimated $T_{LATENCY}$. In this way, the pre-fetch may be completed at substantially the same time as associated receive packet through that connection is received from the network. The offload engine 270 may then process and provide the receive packet to the host processor 210 without an unnecessary delay (e.g., during $T_{LATENCY}$).

Note that $T_{ROUND-TRIP}$ could vary for any number of reasons (e.g., due to network congestion). Similarly, $T_{LATENCY}$ might change over a period of time (e.g., because of memory accesses being performed for other reasons). As a result, these estimated values might be dynamically adjusted (e.g., by the offload engine 270 and/or the host processor 210) to improve the performance of the server 200. For example, information from the TCP/IP stack might be used to dynamically adjust the estimated $T_{ROUND-TRIP}$ for a connection.

Figure 11:
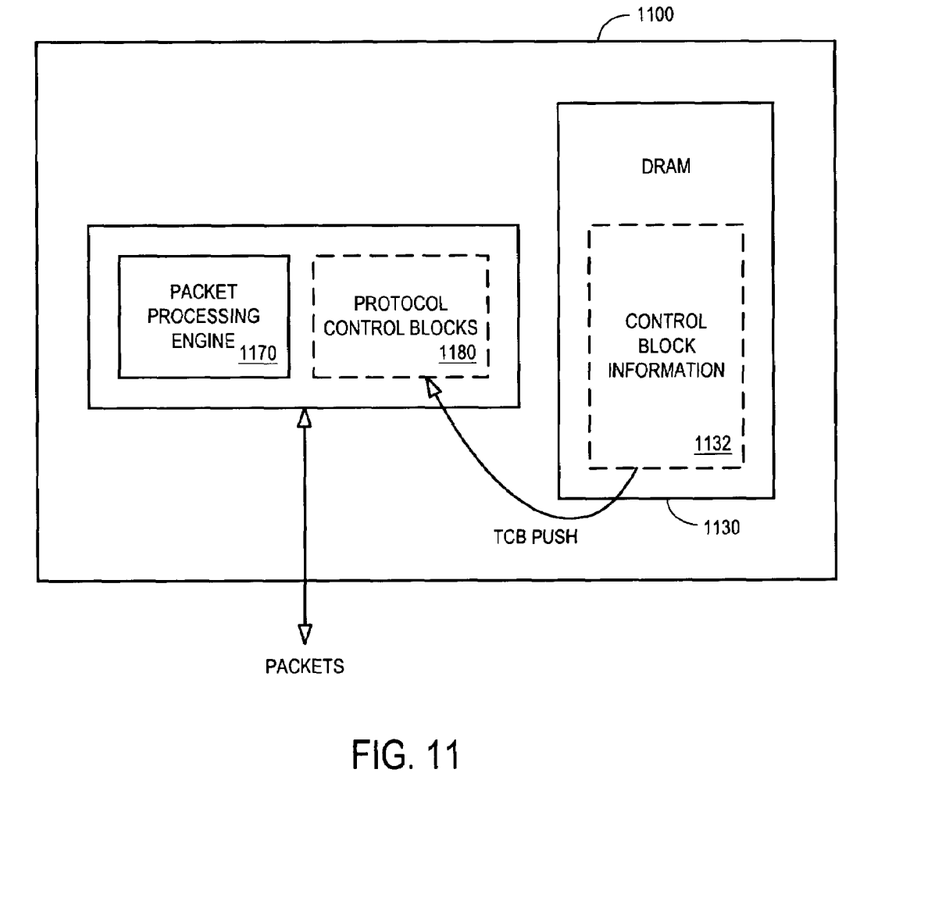
FIG. 11 is a block diagram of a system according to some embodiments.

FIG. 11 is a block diagram of a system 1100 according to some embodiments. The system 1100 includes a Dynamic Random Access Memory (DRAM) 1130 storing protocol control block information 1132. The system 1100 also includes a packet processing engine 1170 to process packets in accordance with any network protocol (e.g., TCP). The packet processing engine 1170 may process a packet, for example, in accordance with a locally stored protocol control block 1180 associated with the connection through which the packet was (or will be) exchanged.

According to some embodiments, the locally stored protocol control blocks 1180 are pre-fetched from the protocol control block information 1132 in the external DRAM 1130. For example, a pre-fetched protocol control block for a connection predicted to subsequently have a packet to be processed by the packet processing engine 1170 may be received (e.g., via an input path) from the DRAM 1130.

Note that the packet processing engine 1170 might predict the connection and calculate a time when the protocol control block should be pre-fetched from the DRAM 1130. This could be achieved, for example, by keeping timers at the packet processing engine 1170 (or on an associated NIC) with entries for all of the TCB entries that will need to be pre-fetched. This, however, might increase the complexity of the NIC hardware and/or software.

According to other embodiments, a host processor predicts the connection and calculates a time when the pre-fetched protocol control block should be "pushed" to the packet processing engine 1170 from the DRAM 1130. For example, the host processor may read the TCB and then push the TCB down through a MCH to the packet processing engine 1170 or the push might be performed through uncached writes to a NIC followed by a NIC initiated Direct Memory Access (DMA) operation.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although same embodiments have been described with respect to TCP packet processing, embodiments may be used in connection with other network protocols, such as User Datagram Protocol (UDP), Transactional TCP (T/TCP), and/or Stream Control Transmission Protocol (SCTP). Moreover, the term "protocol control block" may refer to any information used when processing a packet in accordance with any network protocol (e.g., not just TCB information for TCP).

In addition, although some embodiments have been described with respect to servers, embodiments may be used in connection with other devices, such as a workstation or any other type of network device.

The several embodiments described herein are solely for the purpose of illustration. Persons skilled in the art will recognize from this description other embodiments may be practiced with modifications and alterations limited only by the claims.

What is claimed is:

1. A method, comprising:

speculating, based on a receive packet, a connection that will subsequently have a send packet to be processed in accordance with a transmission control protocol;

dynamically calculating a time when a protocol control block, associated with the speculated connection, is to be pre-fetched from an external memory unit, wherein the time is calculated in accordance with an estimated processing time associated with the receive packet less an estimated latency time associated with pre-fetching the protocol control block from the external memory unit; and in accordance with the dynamically calculated time, a packet processing engine prefetching from the external memory unit the protocol control block associated with the connection.

2. The method of claim 1, wherein the packet processing engine is associated with a network interface card.

3. The method of claim 1, wherein said speculating is performed by the packet processing engine.

4. The method of claim 1, wherein said speculating is performed by a host processor and said arranging comprises:

pushing the protocol control block from the external memory unit to the packet processing engine.

5. The method of claim 1, further comprising:

dynamically adjusting, based on other packets that have been processed, at least one of: (i) the estimated processing time, or (ii) the estimated latency time.

6. A computer-readable storage medium having stored thereon instructions that when executed by a machine result in the following:

speculating, based on a receive packet, a connection that will subsequently have a send packet to be processed in accordance with a transmission control protocol, dynamically calculating a time when a protocol control block, associated with the speculated connection, is to be pre-fetched from an external memory unit, wherein the time is calculated in accordance with an estimated processing time associated with the receive packet less an estimated latency time associated with pre-fetching the protocol control block from the external memory unit, and arranging, in accordance with the dynamically calculated time, for a packet processing engine to pre-fetch from the external memory unit the protocol control block associated with the connection.

7. A system, comprising:

a host processor;

a dynamic random access memory unit; and a network interface card, including:

a packet processing engine, and an input path to receive from the dynamic random access memory unit a pre-fetched protocol control block for a connection predicted to subsequently have a packet to be processed by the packet processing engine in accordance with a transmission control protocol;

wherein the packet processing engine acts as a transmission control protocol offload engine for the host processor, and further wherein the packet processing engine predicts the connection and dynamically calculates a time when the protocol control block should be pre-fetched from the dynamic random access memory unit.

8. A method, comprising:

speculating, based on a send packet, a connection that will subsequently have a receive packet to be processed in accordance with a transmission control protocol;

dynamically calculating a time when a protocol control block, associated with the speculated connection, is to be pre-fetched from an external memory unit, wherein the time is calculated in accordance with an estimated processing time associated with the send packet less an estimated latency time associated with pre-fetching the protocol control block from the external memory unit; and in accordance with the dynamically calculated time, a packet processing engine prefetching from the external memory unit the protocol control block associated with the connection.

9. The method of claim 8, further comprising:

dynamically adjusting, based on other packets that have been processed, at least one of: (i) the estimated round-trip time, or (ii) the estimated latency time.

10. The method of claim 8, wherein said speculating is performed by the packet processing engine.

11. The method of claim 8, wherein said speculating is performed by a host processor and said arranging comprises:

pushing the protocol control block from the external memory unit to the packet processing engine.

12. The method of claim 8, wherein the packet processing engine is associated with a network interface card.

13. A computer-readable storage medium having stored thereon instructions that when executed by a machine result in the following:

speculating, based on a send packet, a connection that will subsequently have a receive packet to be processed in accordance with a transmission control protocol, dynamically calculating a time when a protocol control block, associated with the speculated connection, is to be pre-fetched from an external memory unit, wherein the time is calculated in accordance with an estimated processing time associated with the send packet less an estimated latency time associated with pre-fetching the protocol control block from the external memory unit, and arranging, in accordance with the dynamically calculated time, for a packet processing engine to pre-fetch from the external memory unit the protocol control block associated with the connection.

* * * * *